UNITED STATES PATENT OFFICE.

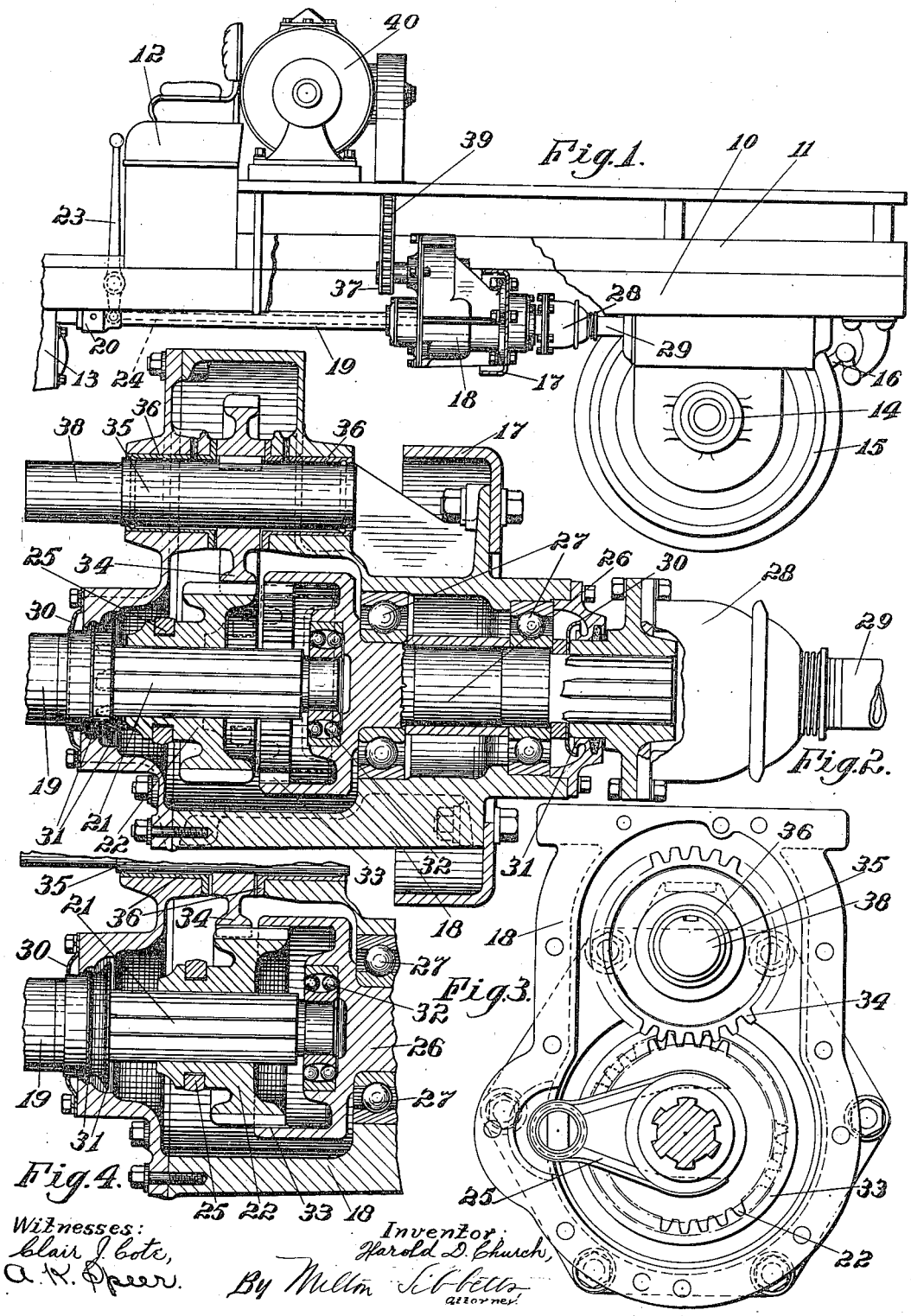

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

GEAR MECHANISM.

1,293,711.               Specification of Letters Patent.      Patented Feb. 11, 1919.

Application filed August 16, 1915. Serial No. 45,801.

*To all whom it may concern:*

Be it known that I, HAROLD D. CHURCH, a citizen of the United States, and resident of Detroit, Wayne county, State of Michigan, have invented certain new and useful Improvements in Gear Mechanism, of which the following is a specification.

This invention relates to motor vehicles and particularly to gearing therefor.

In motor vehicles, particularly trucks or commercial vehicles, it is sometimes desirable to connect an auxiliary mechanism, such as a hoisting mechanism, to the driving shaft of the vehicle. The present invention has for its salient object to provide a simple form of gearing which will permit the operation of such an auxiliary mechanism from the main driving shaft of the vehicle, either separately from the vehicle drive or simultaneously with it.

One form of gearing for accomplishing this object is shown in the accompanying drawings, and it will be understood that this showing is illustrative only of the invention and that various modifications and departures in detail therefrom may be made without departing from the scope of the invention.

Other objects of the invention will also be evident from the following description taken in connection with the drawings, which form a part of this specification, and in which:

Figure 1 is a side elevation of a part of a motor vehicle illustrating the application of this invention to use with a hoisting mechanism on a motor truck;

Fig. 2 is a longitudinal vertical section through the gearing or gear casing shown in Fig. 1;

Fig. 3 is a front view of the gear casing with the front cover removed; and

Fig. 4 is a fragmentary view illustrating the sliding gear shown in Fig. 2 in another position.

Referring to the drawings, 10 represents the main frame of a motor vehicle upon which is mounted a platform body 11, driver's seat 12, and a suitable motor and speed change gear unit 13, the rear end only of which is shown in Fig. 1. A driving axle 14 and wheels 15 support the frame 10 through springs 16.

Suitably supported upon the frame 10, as by one of the cross members 17, is a gear box or gear casing 18 into the front end of which extends a driving shaft 19 which comprises several sections connected as by universal joint 20 and driven from the speed change gearing and motor 13. As shown particularly in Figs. 2 and 3, the end 21 of the driving shaft 19 which extends into the gear box is ribbed or provided with keyways for a sliding spur gear 22. This gear may be shifted from the driver's seat through a shift lever 23, a sliding rod 24, and a yoke 25, as will be clearly understood.

A second shaft 26 is mounted in suitable bearings 27 in the gear box 18 in axial alinement with the driving shaft 19. Said shaft 26 is connected through a suitable universal joint 28 and propeller shaft 29 with gears (not shown) for driving the axle 14. Suitable devices such as washers 30 and throw-off flanges 31 are provided on the shafts 26 and 19 to prevent the escape of oil from the casing 18. It will be seen also that the end of shaft 19 is mounted in a bearing 32 in the forward end of the shaft 26 to properly support the shaft 19 and insure perfect alinement. The forward end of the shaft 26 is formed with an internal gear 33 of bell shape and large enough to permit the complete nesting of the spur gear 22 within it. Thus the gear 22 may be moved into the position in which it is shown in dotted lines in Fig. 2 for the purpose of driving directly the shaft 26 and consequently the propeller shaft 29 which operates the driving axle 14. The internal gear 33 is simply a toothed member which forms one part of a jaw clutch, the other part of the clutch being formed by the spur gear 22.

The spur gear 22 is also adapted to mesh with another toothed member in the form of a second spur gear 34 upon a shaft 35 mounted in suitable bearings 36 in the casing 18. The shaft 35 has a gear or sprocket 37 mounted upon its projecting end 38, and a chain 39 operated by said sprocket 37 is adapted to drive an auxiliary mechanism such as the hoisting mechanism 40 shown as mounted securely upon the vehicle body 11 above and forwardly of the gear casing 18.

It will be understood that it is desirable at times to operate the vehicle without operating the hoisting mechanism, at other times to operate the hoisting mechanism without operating the vehicle and again it may be desirable to operate both the vehicle and the hoisting mechanism simultaneously. The present mechanism permits of the proper connections for these purposes. Thus the sliding gear 22 may be moved into the position in which it is shown in Fig. 2 and in which it meshes solely with the second spur gear 34 on the shaft 35. There is then no driving connection whatever to the driven shaft 26, the gear 22 being entirely out of mesh with the internal gear 33. Again the gear 22 may be moved rearwardly into the position in which it is shown in Fig. 4 and both of the driving shafts 26 and 35 will then be driven. It will be seen that the face of the sliding spur gear 22 is large enough to thus mesh simultaneously with the spur gear 34 and the internal gear 33 besides bridging the small space between them.

Again the sliding gear 22 may be moved into the position in which it is shown in dotted lines in Fig. 2 where it is in mesh or clutching relation solely with the internal gear 33 and is disconnected entirely from the spur gear 34. The latter gear therefore is idle and the driving shaft 19 drives only the driven shaft 26 and its connected propeller shaft 29 which operates the vehicle.

It will be observed that these three different connections are made by a mechanism which includes a single movable element only, that is, the sliding gear 22 which is adapted to mesh separately with the gears or toothed members 33 and 34 or simultaneously with both of them. It will be seen also that by the arrangement shown the auxiliary mechanism may be driven by the motor at the several different speeds of the speed change gearing, as well as the driven shaft 26.

Having thus described my invention, what I claim and desire to secure by Letters Patent is:—

1. In gearing, in combination, a driving shaft, an alined driven shaft having an internal gear thereon, a parallel driven shaft having no geared connection with the alined driven shaft, and means for driving either of said driven shafts from said driving shaft, said means engaging the internal gear when driving the alined shaft.

2. In gearing, in combination, a driving shaft, an alined driven shaft, having an internal gear thereon, a parallel driven shaft having a spur gear thereon, and a gear sliding on said driving shaft and adapted to engage either said spur gear or said internal gear or both simultaneously.

3. In gearing, in combination, a casing, shafts mounted to rotate therein, spur gears on two of said shafts, and an internal gear on another of said shafts, and means for moving one of said spur gears into engagement with the other while it is out of engagement with the internal gear, or into engagement with said internal gear while it is out of engagement with the other spur gear, or into engagement with both said internal gear and the other spur gear simultaneously.

4. In gearing, in combination, a driving shaft, two driven shafts, one of said driven shafts being alined with said driving shaft, a sliding gear on the driving shaft, a toothed member on each of the driven shafts, and means for sliding said gear into mesh with either separately or both simultaneously of said toothed members.

5. In gearing, in combination, a driving shaft, two driven shafts, a sliding gear on one of said shafts, a toothed member on each of the other shafts, and means for sliding said gear into mesh with either of said toothed members separately or with both simultaneously.

6. In gearing, in combination, a driving shaft, two driven shafts, one of said driven shafts being alined with said driving shaft, and means including a single movable element for driving either or both of the driven shafts from the driving shafts.

7. In a motor vehicle, in combination, a gear casing, a driving shaft therein, two driven shafts, means connecting one of said driven shafts to drive the vehicle, means connecting the other of said driven shafts to drive an auxiliary mechanism on the vehicle, and means including a single movable element for connecting said driving shaft to either or both of the driven shafts.

8. In gearing, in combination, a driving shaft having a sliding spur gear thereon, an alined driven shaft having an internal gear thereon, a second gear, and means for moving said sliding gear to mesh either solely with said internal gear, simultaneously with said second spur gear and said internal gear, or solely with said second spur gear.

9. In gearing, in combination, two alined shafts and a parallel shaft, a spur gear permanently connected to the parallel shaft, an internal gear of bell form on one of the alined shafts, and a sliding spur gear on the other alined shaft adapted to mesh simultaneously with the other two gears.

10. In gearing, in combination, two alined shafts and a parallel shaft, a spur gear on the parallel shaft, an internal gear of bell form on one of the alined shafts, and a sliding spur gear on the other alined shaft adapted to mesh simultaneously with the other two gears, said sliding gear also being adapted to be moved out of engagement with the other spur gear and nested wholly within said internal gear.

11. In gearing, in combination, a driving shaft, an alined driven shaft, having an internal gear thereon, a parallel driven shaft having a spur gear thereon, and a gear sliding on said driving shaft and adapted to engage either said spur gear or said internal gear.

12. In gearing, in combination, a driving shaft, an alined driven shaft, a parallel driven shaft and means on said driving shaft for driving either or both of said driven shafts from said driving shaft.

13. In gearing, in combination, a driving shaft, an alined driven shaft, a parallel driven shaft and a slidable element on said driving shaft for driving either or both of said driven shafts from said driving shaft.

14. In a motor vehicle, in combination, a gear casing, a driving shaft therein, a driven shaft alined with said driving shaft to drive the vehicle, a second driven shaft parallel to said driving shaft to drive an auxiliary mechanism on the vehicle and means on said driving shaft for driving either or both of said driven shafts from said driving shaft.

15. In a motor vehicle, in combination, a gear casing, a driving shaft therein, a driven shaft alined with said driving shaft to drive the vehicle, a second driven shaft parallel to said driving shaft to drive an auxiliary mechanism on the vehicle, and a slidable element on said driving shaft for driving either or both of said driven shafts from said driving shaft.

In testimony whereof I affix my signature in the presence of two witnesses.

HAROLD D. CHURCH.

Witnesses:
 CLAIR J. COTE,
 A. K. SPEER.